US008427496B1

(12) United States Patent
Tamasi et al.

(10) Patent No.: US 8,427,496 B1
(45) Date of Patent: Apr. 23, 2013

(54) METHOD AND SYSTEM FOR IMPLEMENTING COMPRESSION ACROSS A GRAPHICS BUS INTERCONNECT

(75) Inventors: Anthony Michael Tamasi, San Jose, CA (US); John M. Danskin, Cranston, RI (US); David G. Reed, Saratoga, CA (US); Brian M. Kelleher, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 511 days.

(21) Appl. No.: 11/129,099

(22) Filed: May 13, 2005

(51) Int. Cl.
*G06F 12/02* (2006.01)
*G06T 9/00* (2006.01)
*G06T 1/60* (2006.01)

(52) U.S. Cl.
USPC ............................. 345/544; 345/555; 345/530

(58) Field of Classification Search .................. 345/542, 345/544, 530, 520, 501, 555, 545
See application file for complete search history.

(56) References Cited

U.S. PATENT DOCUMENTS

| | | | |
|---|---|---|---|
| 4,208,810 A | 6/1980 | Rohner et al. | |
| 4,918,626 A | 4/1990 | Watkins et al. | |
| 5,081,594 A | 1/1992 | Horsley | |
| 5,212,633 A * | 5/1993 | Franzmeier | 703/23 |
| 5,237,460 A * | 8/1993 | Miller et al. | 360/8 |
| 5,287,438 A | 2/1994 | Kelleher | |
| 5,313,287 A | 5/1994 | Barton | |
| 5,432,898 A | 7/1995 | Curb et al. | |
| 5,446,836 A | 8/1995 | Lentz et al. | |
| 5,452,104 A | 9/1995 | Lee | |
| 5,452,412 A | 9/1995 | Johnson, Jr. et al. | |
| 5,483,258 A | 1/1996 | Cornett et al. | |
| 5,543,935 A | 8/1996 | Harrington | |
| 5,570,463 A | 10/1996 | Dao | |
| 5,594,854 A | 1/1997 | Baldwin et al. | |
| 5,623,692 A | 4/1997 | Priem et al. | |
| 5,633,297 A | 5/1997 | Valko et al. | |
| 5,664,162 A | 9/1997 | Dye | |
| 5,815,162 A | 9/1998 | Levine | |
| 5,854,631 A | 12/1998 | Akeley et al. | |
| 5,854,637 A | 12/1998 | Sturges | |
| 5,872,902 A | 2/1999 | Kuchkuda et al. | |
| 5,977,987 A | 11/1999 | Duluk, Jr. | |

(Continued)

FOREIGN PATENT DOCUMENTS

| | | |
|---|---|---|
| CN | 101093578 | 12/2007 |
| JP | 06180758 | 6/1994 |

(Continued)

OTHER PUBLICATIONS

A Hardware Assisted Design Rule Check Architecture Larry Seller Jan. 1982 Proceedings of the 19th Conference on Design Automation DAC '82 Publisher: IEEE Press.

(Continued)

*Primary Examiner* — Joni Richer

(57) ABSTRACT

A system for compressed data transfer across a graphics bus in a computer system. The system includes a bridge, a system memory coupled to the bridge, and a graphics bus coupled to the bridge. A graphics processor is coupled to the graphics bus. The graphics processor is configured to compress graphics data and transfer compressed graphics data across the graphics bus to the bridge for subsequent storage in the system memory.

19 Claims, 5 Drawing Sheets

U.S. PATENT DOCUMENTS

| | | | |
|---|---|---|---|
| 6,028,608 A | 2/2000 | Jenkins | |
| 6,034,699 A | 3/2000 | Wong et al. | |
| 6,072,500 A | 6/2000 | Foran et al. | |
| 6,104,407 A | 8/2000 | Aleksic et al. | |
| 6,104,417 A | 8/2000 | Nielsen et al. | |
| 6,115,049 A | 9/2000 | Winner et al. | |
| 6,118,394 A | 9/2000 | Onaya | |
| 6,128,000 A | 10/2000 | Jouppi et al. | |
| 6,137,918 A | 10/2000 | Harrington et al. | |
| 6,160,557 A | 12/2000 | Narayanaswami | |
| 6,160,559 A | 12/2000 | Omtzigt | |
| 6,188,394 B1 | 2/2001 | Morein et al. | |
| 6,201,545 B1 | 3/2001 | Wong et al. | |
| 6,204,859 B1 | 3/2001 | Jouppi et al. | |
| 6,219,070 B1 | 4/2001 | Baker et al. | |
| 6,249,853 B1 | 6/2001 | Porterfield | |
| 6,259,460 B1 | 7/2001 | Gossett et al. | |
| 6,323,874 B1 | 11/2001 | Gossett | |
| 6,359,623 B1 | 3/2002 | Larson | |
| 6,362,819 B1 | 3/2002 | Dalal et al. | |
| 6,366,289 B1 | 4/2002 | Johns | |
| 6,429,877 B1 | 8/2002 | Stroyan | |
| 6,437,780 B1 | 8/2002 | Baltaretu et al. | |
| 6,452,595 B1 | 9/2002 | Montrym et al. | |
| 6,469,707 B1 | 10/2002 | Voorhies | |
| 6,480,205 B1 | 11/2002 | Greene et al. | |
| 6,501,564 B1 | 12/2002 | Schramm et al. | |
| 6,504,542 B1 | 1/2003 | Voorhies et al. | |
| 6,522,329 B1 | 2/2003 | Ihara et al. | |
| 6,523,102 B1 * | 2/2003 | Dye et al. | 711/170 |
| 6,525,737 B1 | 2/2003 | Duluk, Jr. et al. | |
| 6,529,207 B1 | 3/2003 | Landau et al. | |
| 6,545,684 B1 * | 4/2003 | Dragony et al. | 345/531 |
| 6,606,093 B1 | 8/2003 | Gossett et al. | |
| 6,611,272 B1 | 8/2003 | Hussain et al. | |
| 6,614,444 B1 | 9/2003 | Duluk, Jr. et al. | |
| 6,614,448 B1 | 9/2003 | Garlick et al. | |
| 6,624,823 B2 | 9/2003 | Deering | |
| 6,633,197 B1 | 10/2003 | Sutardja | |
| 6,633,297 B2 | 10/2003 | McCormack et al. | |
| 6,646,639 B1 | 11/2003 | Greene et al. | |
| 6,671,000 B1 | 12/2003 | Cloutier | |
| 6,693,637 B2 | 2/2004 | Koneru et al. | |
| 6,693,639 B2 | 2/2004 | Duluk, Jr. et al. | |
| 6,697,063 B1 | 2/2004 | Zhu | |
| 6,704,022 B1 * | 3/2004 | Aleksic | 345/555 |
| 6,717,576 B1 | 4/2004 | Duluk, Jr. et al. | |
| 6,717,578 B1 | 4/2004 | Deering | |
| 6,734,861 B1 | 5/2004 | Van Dyke et al. | |
| 6,741,247 B1 | 5/2004 | Fenney | |
| 6,747,057 B2 | 6/2004 | Ruzafa et al. | |
| 6,765,575 B1 | 7/2004 | Voorhies et al. | |
| 6,778,177 B1 | 8/2004 | Furtner | |
| 6,788,301 B2 | 9/2004 | Thrasher | |
| 6,798,410 B1 | 9/2004 | Redshaw et al. | |
| 6,803,916 B2 | 10/2004 | Ramani et al. | |
| 6,819,332 B2 | 11/2004 | Baldwin | |
| 6,833,835 B1 | 12/2004 | van Vugt | |
| 6,901,497 B2 * | 5/2005 | Tashiro et al. | 711/173 |
| 6,906,716 B2 | 6/2005 | Moreton et al. | |
| 6,938,176 B1 | 8/2005 | Alben et al. | |
| 6,940,514 B1 | 9/2005 | Wasserman et al. | |
| 6,947,057 B2 | 9/2005 | Nelson et al. | |
| 6,956,579 B1 | 10/2005 | Diard et al. | |
| 6,961,057 B1 | 11/2005 | Van Dyke et al. | |
| 6,978,317 B2 | 12/2005 | Anantha et al. | |
| 7,002,591 B1 | 2/2006 | Leather et al. | |
| 7,009,607 B2 | 3/2006 | Lindholm et al. | |
| 7,009,615 B1 | 3/2006 | Kilgard et al. | |
| 7,061,495 B1 | 6/2006 | Leather | |
| 7,061,640 B1 * | 6/2006 | Maeda | 358/1.17 |
| 7,064,771 B1 | 6/2006 | Jouppi et al. | |
| 7,075,542 B1 | 7/2006 | Leather | |
| 7,081,902 B1 | 7/2006 | Crow et al. | |
| 7,119,809 B1 | 10/2006 | McCabe | |
| 7,126,600 B1 | 10/2006 | Fowler et al. | |
| 7,154,066 B2 | 12/2006 | Talwar et al. | |
| 7,158,148 B2 | 1/2007 | Toji et al. | |
| 7,167,259 B2 * | 1/2007 | Varga | 358/1.15 |
| 7,170,515 B1 | 1/2007 | Zhu | |
| 7,184,040 B1 | 2/2007 | Tzvetkov | |
| 7,224,364 B1 | 5/2007 | Yue et al. | |
| 7,243,191 B2 * | 7/2007 | Ying et al. | 711/118 |
| 7,307,628 B1 | 12/2007 | Goodman et al. | |
| 7,307,638 B2 | 12/2007 | Leather et al. | |
| 7,317,459 B2 | 1/2008 | Fouladi et al. | |
| 7,382,368 B1 | 6/2008 | Molnar et al. | |
| 7,453,466 B2 | 11/2008 | Hux et al. | |
| 7,483,029 B2 | 1/2009 | Crow et al. | |
| 7,548,996 B2 | 6/2009 | Baker et al. | |
| 7,551,174 B2 | 6/2009 | Iourcha et al. | |
| 7,633,506 B1 | 12/2009 | Leather et al. | |
| 7,634,637 B1 | 12/2009 | Lindholm et al. | |
| 7,791,617 B2 | 9/2010 | Crow et al. | |
| 7,965,902 B1 | 6/2011 | Zelinka et al. | |
| 8,063,903 B2 | 11/2011 | Vignon et al. | |
| 2001/0005209 A1 | 6/2001 | Lindholm et al. | |
| 2002/0050979 A1 | 5/2002 | Oberoi et al. | |
| 2002/0097241 A1 | 7/2002 | McCormack et al. | |
| 2002/0130863 A1 | 9/2002 | Baldwin | |
| 2002/0140655 A1 | 10/2002 | Liang et al. | |
| 2002/0158885 A1 | 10/2002 | Brokenshire et al. | |
| 2002/0196251 A1 | 12/2002 | Duluk, Jr. et al. | |
| 2003/0067468 A1 | 4/2003 | Duluk, Jr. et al. | |
| 2003/0076325 A1 | 4/2003 | Thrasher | |
| 2003/0122815 A1 | 7/2003 | Deering | |
| 2003/0163589 A1 | 8/2003 | Bunce et al. | |
| 2003/0194116 A1 | 10/2003 | Wong et al. | |
| 2003/0201994 A1 | 10/2003 | Taylor et al. | |
| 2004/0085313 A1 | 5/2004 | Moreton et al. | |
| 2004/0130552 A1 | 7/2004 | Duluk, Jr. et al. | |
| 2004/0183801 A1 | 9/2004 | Deering | |
| 2004/0196285 A1 | 10/2004 | Rice et al. | |
| 2004/0207642 A1 | 10/2004 | Crisu et al. | |
| 2004/0246251 A1 | 12/2004 | Fenney et al. | |
| 2005/0030314 A1 | 2/2005 | Dawson | |
| 2005/0041037 A1 | 2/2005 | Dawson | |
| 2005/0066148 A1 | 3/2005 | Luick | |
| 2005/0122338 A1 | 6/2005 | Hong et al. | |
| 2005/0134588 A1 | 6/2005 | Aila et al. | |
| 2005/0134603 A1 | 6/2005 | Iourcha et al. | |
| 2005/0179698 A1 | 8/2005 | Vijayakumar et al. | |
| 2005/0259100 A1 | 11/2005 | Teruyama | |
| 2006/0044317 A1 | 3/2006 | Bourd et al. | |
| 2006/0170690 A1 | 8/2006 | Leather | |
| 2006/0203005 A1 | 9/2006 | Hunter | |
| 2006/0245001 A1 | 11/2006 | Lee et al. | |
| 2006/0267981 A1 | 11/2006 | Naoi | |
| 2006/0282604 A1 | 12/2006 | Temkine et al. | |
| 2007/0008324 A1 | 1/2007 | Green | |
| 2007/0129990 A1 | 6/2007 | Tzruya et al. | |
| 2007/0139440 A1 | 6/2007 | Crow et al. | |
| 2007/0268298 A1 | 11/2007 | Alben et al. | |
| 2007/0273689 A1 | 11/2007 | Tsao | |
| 2007/0296725 A1 | 12/2007 | Steiner et al. | |
| 2008/0024497 A1 | 1/2008 | Crow et al. | |
| 2008/0024522 A1 | 1/2008 | Crow et al. | |
| 2008/0034238 A1 | 2/2008 | Hendry et al. | |
| 2008/0100618 A1 | 5/2008 | Woo et al. | |
| 2008/0158233 A1 | 7/2008 | Shah et al. | |
| 2008/0273218 A1 | 11/2008 | Kitora et al. | |
| 2009/0153540 A1 | 6/2009 | Blinzer et al. | |
| 2010/0226441 A1 | 9/2010 | Tung et al. | |

FOREIGN PATENT DOCUMENTS

| | | |
|---|---|---|
| JP | 10134198 | 5/1998 |
| JP | 11195132 | 7/1999 |
| JP | 2005182547 | 7/2005 |
| WO | 0013145 | 3/2000 |

OTHER PUBLICATIONS

A Parallel Alogorithm for Polygon Rasterization Juan Pineda Jun. 1988 ACM.

A VLSI Architecture for Updating Raster-Scan Displays Satish Gupta, Robert F. Sproull, Ivan E. Sutherland Aug. 1981 ACM SIGGRAPH Computer Graphics, Proceedings of the 8th Annual Conference on Computer Graphics and Interactive Techniques SIGGRAPH '81, vol. 15 Issue Publisher: ACM Press.

Blythe, OpenGL section 3.4.1, Basic Line Segment Rasterization, Mar. 29, 1997, pp. 1-3.

Boyer, et al.; "Discrete Analysis for Antialiased Lines;" Eurographics 2000; 3 Pages.

Crow; "The Use of Grayscale for Improves Raster Display of Vectors and Characters;" University of Texas, Austin, Texas; Work supported by the National Science Foundation unser Grants MCS 76-83889; pp. 1-5: ACM Press.

Foley, J. "Computer Graphics: Principles and Practice", 1987, Addison-Wesley Publishing, 2nd Edition, p. 545-546.

Fuchs; "Fast Spheres Shadow, Textures, Transparencies, and Image Enhancements in Pixel-Planes"; ACM; 1985; Department of Computer Science, University of North Carolina at Chapel Hill, Chapel Hill, NC 27514.

* cited by examiner

METHOD AND SYSTEM FOR IMPLEMENTING COMPRESSION ACROSS A GRAPHICS BUS INTERCONNECT

FIELD OF THE INVENTION

The present invention is generally related to graphics computer systems.

BACKGROUND OF THE INVENTION

Generally, a computer system suited to handle 3D image data includes a specialized graphics processor unit, or GPU, in addition to a traditional CPU (central processing unit). The GPU includes specialized hardware configured to handle 3D computer-generated objects. The GPU is configured to operate on a set of data models and their constituent "primitives" (usually mathematically described polygons) that define the shapes, positions, and attributes of the objects. The hardware of the GPU processes the objects, implementing the calculations required to produce realistic 3D images on a display of the computer system.

The performance of a typical graphics rendering process is highly dependent upon the performance of the system's underlying hardware. High performance real-time graphics rendering requires high data transfer bandwidth to the memory storing the 3D object data and the constituent primitives. Thus, more expensive prior art GPU subsystems (e.g., GPU equipped graphics cards) typically include larger (e.g., 128 MB or larger) specialized, expensive, high bandwidth local graphics memories for feeding the required data to the GPU. Less expensive prior art GPU subsystems include smaller (e.g., 64 MB or less) such local graphics memories, and some of the least expensive GPU subsystems have no local graphics memory.

A problem with the prior art low-cost GPU subsystems (e.g., having smaller amounts of local graphics memory) is the fact that the data transfer bandwidth to the system memory, or main memory, of a computer system is much less than the data transfer bandwidth to the local graphics memory. Typical GPUs with any amount of local graphics memory need to read command streams and scene descriptions from system memory. A GPU subsystem with a small or absent local graphics memory also needs to communicate with system memory in order to access and update pixel data including pixels representing images which the GPU is constructing. This communication occurs across a graphics bus, or the bus that connects the graphics subsystem to the CPU and system memory.

In one example, per-pixel Z-depth data is read across the system bus and compared with a computed value for each pixel to be rendered. For all pixels which have a computed Z value less than the Z value read from system memory, the computed Z value and the computed pixel color value are written to system memory. In another example, pixel colors are read from system memory and blended with computed pixel colors to produce translucency effects before being written to system memory. Higher resolution images (images with a greater number of pixels) require more system memory bandwidth to render. Images representing larger numbers of 3D objects require more system memory bandwidth to render. The low data transfer bandwidth of the graphics bus acts as a bottleneck on overall graphics rendering performance.

Thus, what is required is a solution capable of reducing the limitations imposed by the limited data transfer bandwidth of a graphics bus of a computer system. What is required is a solution that ameliorates the bottleneck imposed by the much smaller data transfer bandwidth of the graphics bus in comparison to the data transfer bandwidth of the GPU to local graphics memory. The present invention provides a novel solution to the above requirement.

SUMMARY OF THE INVENTION

Embodiments of the present invention ameliorate the bottleneck imposed by the much smaller data transfer bandwidth of the graphics bus in comparison to the data transfer bandwidth of the GPU to local graphics memory.

In one embodiment, the present invention is implemented as a system for compressed data transfer across a graphics bus in a computer system. The system includes a bridge, a system memory coupled to the bridge, and a graphics bus coupled to the bridge. A graphics processor (e.g., GPU) is coupled to the graphics bus. The GPU is configured to compress graphics data and transfer compressed graphics data across the graphics bus to the bridge for subsequent storage in the system memory.

In one embodiment, the bridge can be configured to store the compressed graphics data directly into the system memory (e.g., in compressed form). Alternatively, the bridge can be configured to decompress the compressed graphics data and store the resulting decompressed graphics data into the system memory (e.g., in uncompressed form), in accordance with any specific requirements of a system memory management system (e.g., minimum block access size, latency, etc.).

In one embodiment, a transfer logic unit within the bridge performs an efficient data merge operation with pre-existing, compressed graphics data stored in the system memory. The transfer logic unit is configured to fetch and decompress the pre-existing graphics data from the system memory, decompress the compressed graphics data from the GPU, and generate merged data therefrom. The merged data is then compressed and stored in the system memory.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
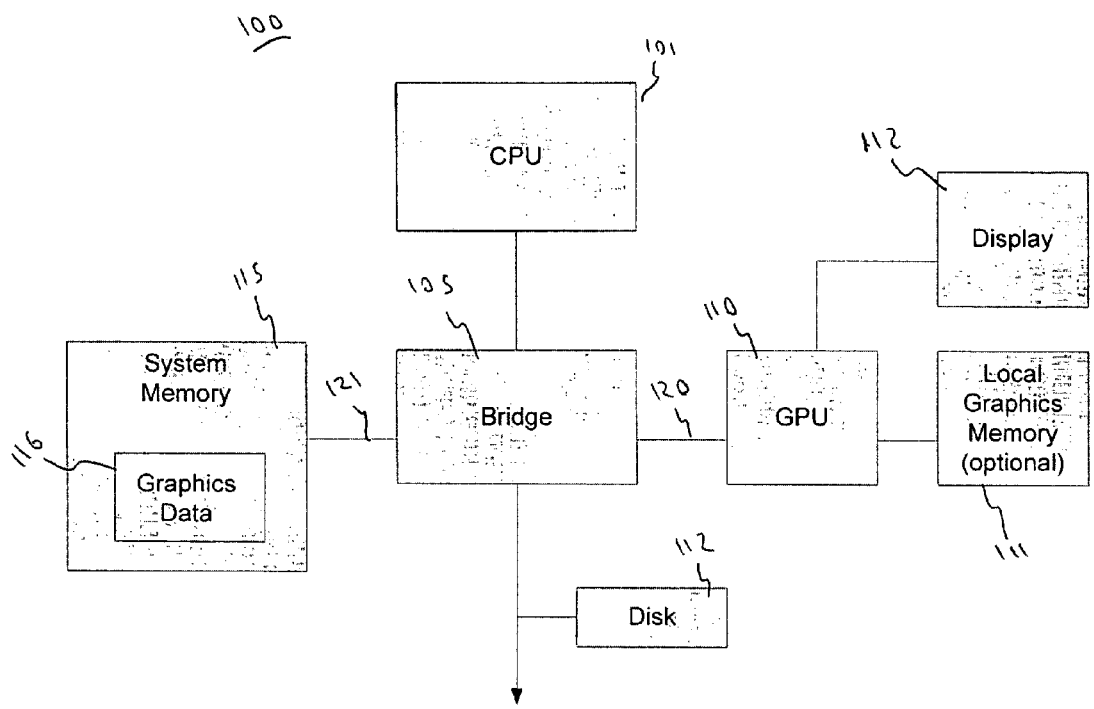
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via the bridge component 105 or can be directly coupled to the system memory 115 via a memory controller internal to the CPU 101. The GPU 110 is coupled to a display 112. System 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory, IO devices (e.g., disk drive 112), and the like. The bridge component 105 also supports expansion buses coupling the disk drive 112.

It should be appreciated that although the GPU 110 is depicted in FIG. 1 as a discrete component, the GPU 110 can be implemented as a discrete graphics card designed to couple to the computer system via a graphics bus connection (e.g., AGP, PCI Express, etc.), as a discrete integrated circuit die (e.g., mounted directly on the motherboard), or as an integrated GPU included within the integrated circuit die of a computer system chipset component (e.g., integrated within the bridge chip 105). Additionally, a local graphics memory 111 can optionally be included for the GPU 110 for high bandwidth graphics data storage. It also should be noted that although the bridge component 105 is depicted as a discrete component, the bridge component 105 can be implemented as an integrated controller within a different component (e.g., within the CPU 101, GPU 110, etc.) of the computer system 100. Similarly, system 100 can be implemented as a set-top video game console device such as, for example, the Xbox®, available from Microsoft Corporation of Redmond, Wash.

Embodiments of the Present Invention

Referring still to FIG. 1, embodiments of the present invention reduce constraints imposed by the limited data transfer bandwidth of a graphics bus (e.g., graphics bus 120) of a computer system. Embodiments of the present invention ameliorate the bottleneck imposed by the much smaller data transfer bandwidth of the graphics bus 120 in comparison to the data transfer bandwidth of the system memory bus 121 to system memory 115. This is accomplished in part by the GPU 110 compressing graphics data and transferring the compressed graphics data across the graphics bus 120 to the bridge 105 for subsequent storage in the system memory 115.

The compression reduces the total amount data that must be transferred across the bandwidth constrained graphics bus 120. The resulting reduction in access latency, and increase in transfer speed, allows the GPU 110 to more efficiently access graphics data 116 stored within the system memory 115, thereby increasing the performance of bandwidth-limited 3D rendering applications. This data transfer process is described in further detail in FIG. 2 below.

Figure 2:
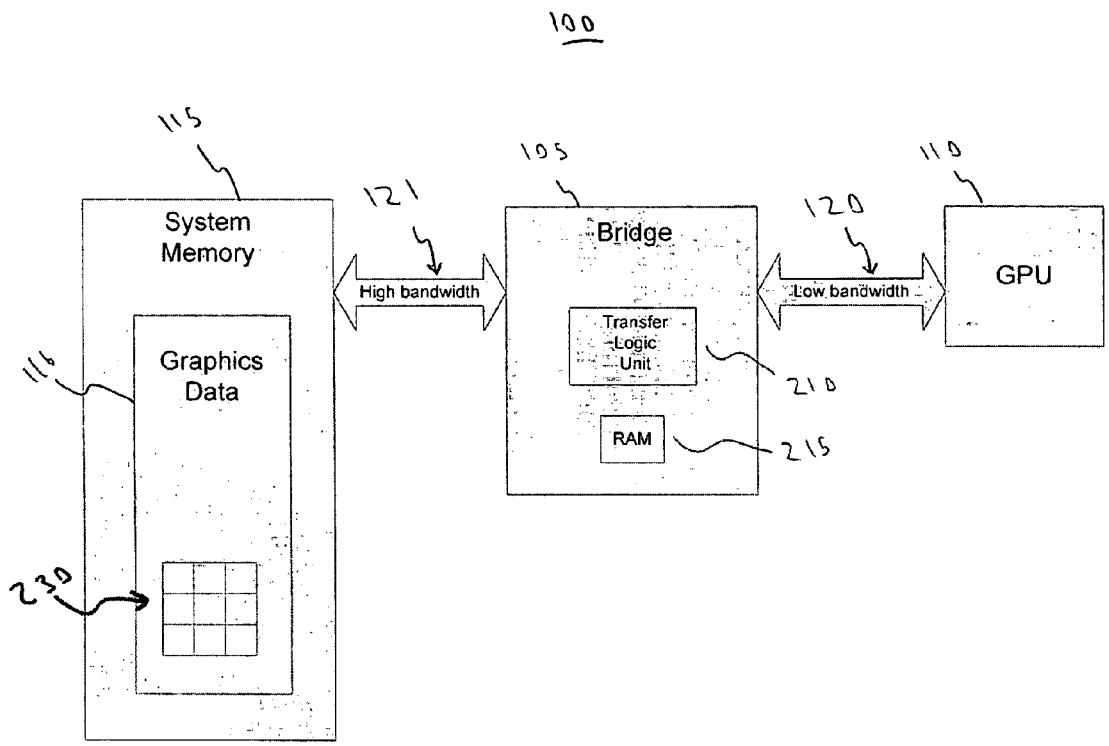
FIG. 2 shows a diagram depicting an efficient compressed graphics data transfer process as implemented by a computer system in accordance with one embodiment of the present invention.

FIG. 2 shows a diagram depicting an efficient compressed graphics data transfer process in accordance with one embodiment of the present invention. As depicted in FIG. 2, the GPU 110 is coupled to the bridge 105 via the low bandwidth graphics bus 120. The bridge 105 is further coupled to the system memory 115 via the high bandwidth system memory bus 121.

In one embodiment, the bridge 105 is configured to store the compressed graphics data received from the GPU 110 via the graphics bus 120 directly into the system memory 115 (e.g., in compressed form). In such an embodiment, the graphics processor 110 executes a compression algorithm (e.g., codec) and compresses graphics data prior to transmission across the graphics bus 120 to the bridge 105. As described above, the compression reduces the total number of bits that must be sent across the bandwidth constrained graphics bus 120. A typical compression ratio can yield a four to one reduction (e.g., 128 bytes being compressed to 32 bytes) which would yield a fourfold effective increase in the data transfer bandwidth of the graphics bus 120. The resulting compressed graphics data is then stored by the bridge 105 directly into the system memory 115 (e.g., as graphics data 116). When the graphics data is subsequently needed by the GPU 110, it is fetched from the system memory 115, across the system memory bus 121 and the graphics bus 120 in compressed form, and decompressed within the GPU 110.

It should be noted that, in some memory management systems, the direct storage of compressed graphics data within the system memory 115 can generate undesirable complications for the system memory management system. For example, many systems have a minimum data access size. For maximum efficiency, it is desirable to match data writes and data reads to the system memory 115 with this minimum data access size. Industry-standard x86 machines typically have a 128 byte minimum data access size (e.g., corresponding to a single CPU cache line), or "tile" size (e.g., tiles 230). Thus, in some applications, it may be desirable to decompress the compressed graphics data received from the GPU 110 prior to storage in the system memory 115 to more correctly align with the 128 bytes tile size.

Accordingly, in one embodiment, the bridge 105 is configured to decompress the compressed graphics data received from the GPU 110 via the graphics bus 120. A transfer logic unit 120 is included within the bridge 105 to execute the decompression algorithm (e.g., the codec). A RAM 215 within the bridge 105 can be used for temporary storage. The resulting decompressed graphics data is then stored into the system memory 115 (e.g., in uncompressed form), in accordance with any specific requirements of a system memory management system (e.g., 128 byte tile size).

Figure 3:
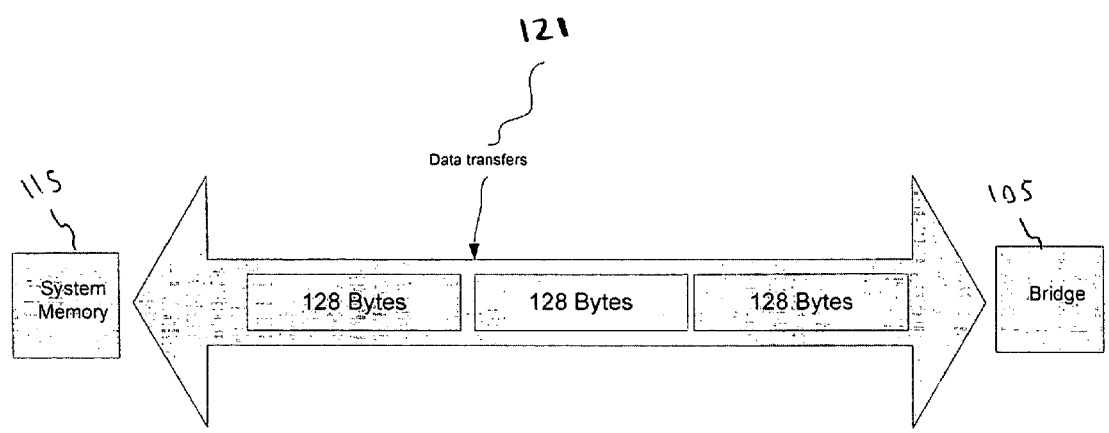
FIG. 3 shows a diagram depicting a data transfer across system memory bus in accordance with a plurality of 128 byte system memory tile sizes in accordance with one embodiment of the present invention.

FIG. 3 shows a diagram depicting a data transfer across system memory bus 121 in accordance with a plurality of 128 byte system memory tile sizes (e.g., tiles 230 of FIG. 2). In one embodiment, a transfer logic unit 210 of the bridge 105 performs an efficient data merge operation with pre-existing, compressed graphics data 116 stored in the system memory 115. As described above, it is desirable that graphics data be stored within system memory 115 in alignment with the minimum block access size/tile size of the system memory 115. However, in this embodiment, compressed graphics data is stored in the system memory 115, in proper alignment with the minimum tile size, as opposed to uncompressed graphics data. To accomplish the alignment, the transfer logic unit 210 must execute a data merge operation with the pre-existing compressed graphics data already stored within the tiles 230 of the graphics data 116.

In one embodiment, the data merge is performed by the transfer logic unit 210 fetching and decompressing the pre-existing graphics data from the tiles 230, decompressing the compressed graphics data from the GPU 110, and generating merged data therefrom. As described above, the RAM 215 can be used as temporary storage. The merged data is then compressed by the transfer logic unit 210 and stored, in alignment, in the tiles 230 of the system memory 115.

In this manner, embodiments of the present invention greatly improve on the efficiency of data transfers and accesses to/from the system memory 115 in comparison to prior art solutions. For example, compressed graphics data is transferred across the bandwidth constrained graphics bus 120 and is merged and stored within the system memory 115 in compressed form. This minimizes the latency penalties of the graphics bus 120 and maximizes the available space set aside in the system memory 115 for graphics data (e.g., frame buffer, etc.). The benefits provided by the compressed graphics data are applicable in both directions, from the GPU 110 to the system memory 115, and from the system memory 115 back to the GPU 110.

Figure 4:
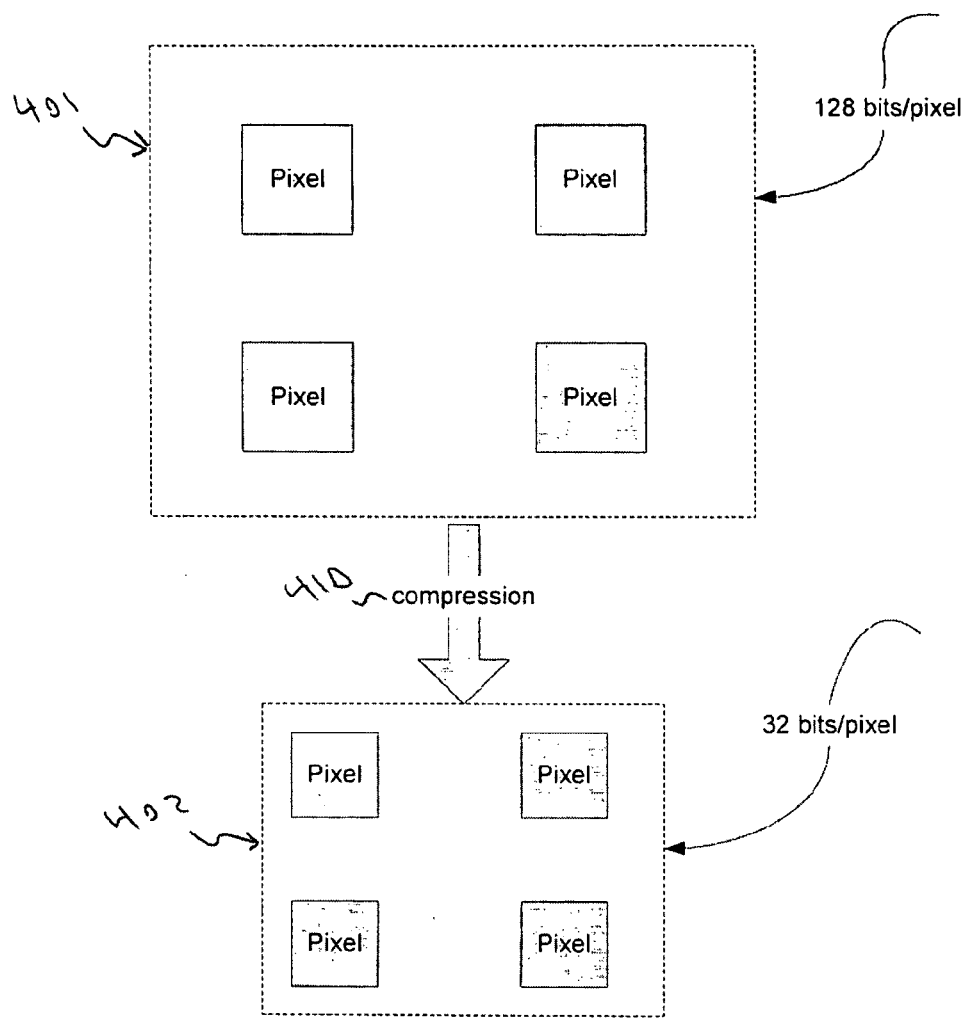
FIG. 4 shows a diagram depicting a four to one compression ratio of a graphics data compression process in accordance with one embodiment of the present invention.

FIG. 4 shows a diagram depicting a four-to-one compression ratio of a graphics data compression process in accordance with one embodiment of the present invention. As depicted in FIG. 4, a four pixel block 401 of graphics data, comprising pixels having 128 bits of information each, is compressed by compression process 410. This yields a resulting compressed four pixel block 402, comprising pixels having 32 bits of information each. Thus, the resulting compressed pixel data comprises the graphics data that must be pushed through the graphics bus 120, both from the GPU 110 to the bridge 105, and from the bridge 105 to the GPU 110.

The above graphics data transfer efficiency benefits enable a computer system in accordance with embodiments of the present invention to perform on a level equal to prior art computer systems having an expensive dedicated local graphics memory (e.g., coupled to the GPU directly). Alternatively, a computer system in accordance with embodiments of the present invention can greatly outperform a similar prior art computer system that uses system memory for graphics data storage (e.g., frame buffer storage, etc.), as opposed to a large expensive local graphics memory.

Figure 5:
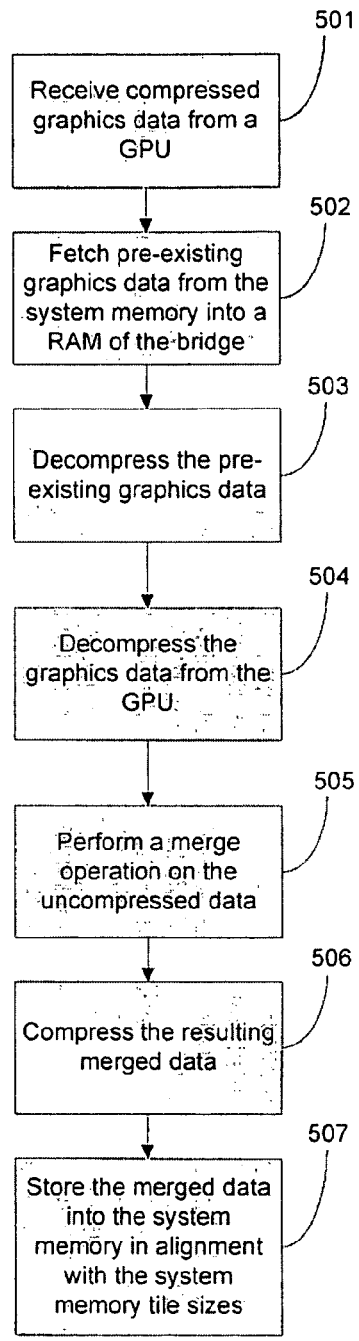
FIG. 5 shows a flowchart of the steps of a graphics data compression and transfer process in accordance with one embodiment of the present invention.

FIG. 5 shows a flowchart of the steps of a graphics data compression and transfer process 500 in accordance with one embodiment of the present invention. As depicted in FIG. 5, process 500 shows the basic steps involved in a graphics data compression and merge operation as implemented by a bridge (e.g., bridge of 105) of a computer system (e.g., computer system 100 of FIG. 2).

Process 500 begins in step 501, where compressed graphics data is received from the GPU 110 by the bridge 105. As described above, the GPU 110 compresses its graphics data prior to pushing it across the bandwidth constrained graphics bus 120. The bridge 105 temporarily stores the compressed graphics data within an internal RAM 215. In step 502, pre-existing graphics data is fetched from the system memory 115 into the internal RAM 215. In step 503, the pre-existing graphics data is decompressed by a transfer logic unit 210 within the bridge 105. In step 504, the graphics data from the GPU 110 is decompressed by the transfer logic unit 210. In step 505, the transfer logic unit 210 performs a merge operation on the uncompressed data. In step 506, the resulting merged data is then recompressed by the transfer logic unit 210. Subsequently, in step 507, the compressed merged data is then stored into the system memory in alignment with the system memory tile sizes 230 (e.g., 128 byte tile size).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for data transfer across a graphics bus in a computer system, comprising:
   a bridge;
   a system memory coupled to the bridge;
   a graphics bus coupled to the bridge; and
   a graphics processor coupled to the graphics bus, wherein the graphics processor is configured to compress graphics data and transfer compressed graphics data across the graphics bus to the bridge, wherein the bridge is configured to divide the graphics data into a plurality of system memory aligned tiles and store the tiles into the system memory, wherein the system memory aligned tiles are aligned with a minimum data access size, and wherein the graphics data is compressed to at least a four to one ratio;

wherein the graphics processor includes a transfer logic unit for merging the compressed graphics data into tiles of pre-existing graphics data stored in the system memory; and wherein a data merge is performed by a transfer logic unit fetching and decompressing pre-existing graphics data from tiles, decompressing the compressed graphics data from the GPU, and generating merged data therefrom, wherein the system memory is used as temporary storage, and wherein the merged data is then compressed by the transfer logic unit and stored, in alignment, in the tiles of the system memory.

2. The system of claim 1, wherein the bridge includes a memory controller and the memory controller is configured to store the compressed graphics data into the system memory.

3. The system of claim 1, wherein the bridge is configured to decompress the compressed graphics data and store decompressed graphics data into the system memory.

4. The system of claim 1, wherein the tiles are sized to align with a plurality of 128 byte boundaries of the system memory.

5. The system of claim 1, wherein the bridge is a North bridge of the computer system.

6. The system of claim 1, wherein the graphics processor is configured to use a portion of the system memory for frame buffer memory.

7. The system of claim 1, wherein the graphics processor is detachably coupled to the graphics bus by a connector.

8. The system of claim 1, wherein the graphics bus is an AGP graphics bus.

9. The system of claim 1, wherein the graphics bus is a SATA graphics bus.

10. A bridge for implementing data transfer across a graphics bus in a computer system, comprising:
    a system memory bus interface;
    a graphics bus interface;
    a RAM;
    a transfer logic unit, wherein the transfer logic unit is configured to receive compressed graphics data from a graphics processor via the graphics bus interface for storage in a system memory, and wherein the transfer logic unit is configured to divide the graphics data into a plurality of system memory aligned tiles and store the tiles into the system memory, wherein the memory aligned tiles are aligned with a minimum data access size, and wherein the graphics data is compressed to at least a four to one ratio; and
    wherein a data merge is performed by a transfer logic unit fetching and decompressing pre-existing graphics data from tiles, decompressing the compressed graphics data from the GPU, and generating merged data therefrom, wherein the system memory is used as temporary storage, and wherein the merged data is then compressed by the transfer logic unit and stored, in alignment, in the tiles of the system memory.

11. The bridge of claim 10, wherein the tiles are sized to align with a plurality of 128 byte boundaries of the system memory.

12. The bridge of claim 10, wherein the bridge is a North bridge of the computer system.

13. The bridge of claim 10, wherein the graphics bus interface is an AGP interface.

14. The bridge of claim 10, wherein the graphics bus interface is a SATA interface.

15. In a bridge of a computer system, a method for implementing data transfer across a graphics bus in a computer system, comprising:
    fetching pre-existing compressed graphics data from a system memory to a RAM of the bridge;
    decompressing the pre-existing compressed graphics data;
    decompressing compressed graphics data received from a graphics processor;
    generating merged data;
    compressing the merged data;
    storing the merged data in the system memory, wherein the merged data is divided into a plurality of system memory aligned tiles and stored as tiles in the system memory, wherein the memory aligned tiles are aligned with a minimum data access size, and wherein the graphics data is compressed to at least a four to one ratio; and
    wherein a data merge is performed by a transfer logic unit fetching and decompressing pre-existing graphics data from tiles, decompressing the compressed graphics data from the GPU, and generating merged data therefrom, wherein the system memory is used as temporary storage, and wherein the merged data is then compressed by the transfer logic unit and stored, in alignment, in the tiles of the system memory.

16. The method of claim 15, wherein the tiles are sized to align with a plurality of 128 byte boundaries of the system memory.

17. The method of claim 15, wherein the bridge is a North bridge of the computer system.

18. The method of claim 15, wherein the graphics processor is configured to use a portion of the system memory for frame buffer memory.

19. The method of claim 15, wherein a transfer logic unit executes a data merge operation with pre-existing compressed graphics data to implement a memory alignment operation.

* * * * *